United States Patent [19]

Veaux et al.

[11] Patent Number: 4,586,682

[45] Date of Patent: May 6, 1986

[54] LANDING GEAR FOR AN AIRCRAFT STRUCTURE

[75] Inventors: Jacques Veaux, Chatillon; Michel Derrien, Versailles, both of France

[73] Assignee: Messier-Hispano-Bugatti, Montrouge, France

[21] Appl. No.: 613,984

[22] Filed: May 25, 1984

[30] Foreign Application Priority Data

May 25, 1983 [FR] France ................................ 83 08571

[51] Int. Cl.[4] .............................................. B64C 25/10
[52] U.S. Cl. ................................................ 244/102 R
[58] Field of Search ........ 244/102 R, 102 A, 102 SL, 244/102 SS

[56] References Cited

U.S. PATENT DOCUMENTS 3,533,580 10/1970 Lucien ............................. 244/102 R
4,422,602 12/1983 Turiot ............................. 244/102 R

FOREIGN PATENT DOCUMENTS 628324 8/1949 United Kingdom ................ 244/102

Primary Examiner—Galen L. Barefoot
Attorney, Agent, or Firm—Sughrue, Mion, Zinn, Macpeak and Seas

[57] ABSTRACT

The low portion (9) of a landing gear strut (3) carrying running means such as a wheel (8) is capable of swivelling together with the running means relative to the strut. A system of cranks (17) receives the necessary force for swivelling the wheel during retraction and extension of the landing gear from a rod (13) which is fixed to the aircraft structure (2) at a point different from the point at which the strut (3) is fixed. The rod (13) is of variable length (piston and cylinder arrangement 31), and the crank system has a stop (33) against excessive swivelling. The arrangement is such that swivelling is restricted to a selected portion of the landing gear's travel, e.g. to ensure that the wheel enters the aircraft body at a particular degree of swivel.

4 Claims, 3 Drawing Figures

LANDING GEAR FOR AN AIRCRAFT STRUCTURE

The present invention relates to landing gear for an aircraft structure, and more particularly to landing gear capable of taking at least two extreme positions: an "extended" position enabling the aircraft to land; and a "retracted" position while the aircraft is in flight.

BACKGROUND OF THE INVENTION

Landing gear of the type capable of taking two extreme positions, more commonly referred to as "retractable", generally comprises a strut having one end pivoted to the structure of the aircraft, generally about a point or an axis, and its other end having means, such as shock absorber means for example, supporting running means, where "running means" is understood to include any means enabling the aircraft to move on the ground. With such a landing gear structure it is often necessary, for reasons of convenience or of constraint associated with available space, for the wheel to swivel relative to the strut when the landing gear is moved to its "retracted" position in a housing provided or the purpose in the aircraft structure, thereby enabling the wheel to occupy the housing while taking up a minimum amount of space. To do this, some landing gears are designed so that when the landing gear passes from one position to the other, ie. between the "extended" and the "retracted" positions, the low portion of the strut is made to pivot relative to the aircraft structure by means of a secondary crank system controlled by a main rod having one end connected to the aircraft structure, thereby rotating the low portion through an angle which is determined by the shape of the structure. Numerous landing gears of this type exist.

However, it should be observed that the wheel is continuously swivelled between the extreme positions of the landing gear, and thus the opening of the housing has to be large enough for the wheel to be able to enter while it is at some intermediate angle between its extreme positions. Further, auxiliary apparatus necessary for the safety of the aircraft in flight is often to be found inside these housings, eg. pumps and servovalves and other hydraulic devices. That is why it can be advantageous in some cases to provide a landing gear structure in which the wheel's swivelling is programmed to enable it to enter its housing under predetermined conditions.

Preferred embodiments of the present invention provide such landing gear in which the entry angle of the wheel into the aircraft structure can be programmed to a predetermined angle in the range of angles through which the wheel is swivelled as the landing gear is retracted.

SUMMARY OF THE INVENTION

The present invention provides landing gear for association with an aircraft structure, the landing gear comprising: at least one strut suitable for pivoting substantially at one of its ends on the said structure, the other end of the strut including support means for running means; means for causing the said strut to pass from a first position to a second position; and means for causing the running means to swivel by a certain amount when the said strut travels between said first and second positions, wherein the said means for swivelling the running means include at least one delay line to cause the said running means to swivel over a portion only of the strut's travel between said first and second positions, and to remain at a constant angle relative to the strut over the remainder of the travel.

The invention also provides landing gear in co-operation with an aircraft structure, the landing gear being of the type which is retractable between two positions, namely an "extended" position and a "retracted" position, and comprising:

at least one strut having a general strut-defining axis, one end of the said strut being suitable for being pivotally mounted about at least a first point on the said structure, the said general strut-defining axis passing substantially through the said first point;

a low portion co-operating with the other end of the said strut and being suitable for swivelling about a first axis relative to the said strut;

a main rod having a first end suitable for being pivotally mounted on a second point of the said structure; and secondary crank means suitable for co-operating with the said strut, the said low portion, and the second end of the said rod to swivel the low portion relative to the strut in response to the said rod exerting a force on the said crank means;

wherein the said rod is suitable for changing length between at least two reference lengths corresponding to a relaxed length and to a compressed length;

wherein the said second point is contained in a dihedral angle defined between two planes which meet at a line passing substantially through the said first point and containing first and second lines representing the positions of the said general strut-defining axis when said landing gear is in its "extended" position and its "retracted" position respectively; and wherein the said crank system has a limiting abutment position preventing any additional swivelling in one direction of the said low portion from a determined position thereof relative to the strut.

BRIEF DESCRIPTION OF THE DRAWINGS

An embodiment of the invention is described by way of example with reference to the accompanying drawings, in which.

MORE DETAILED DESCRIPTION

All three figures are different ways of showing the same embodiment of a landing gear in association with an aircraft structure, so it should be understood that the same references naturally designate the same items, and that in order to understand the following description it will be necessary refer to one or other of the drawings depending on whether items are more or less visible in one or other of the figures.

Figure 1:
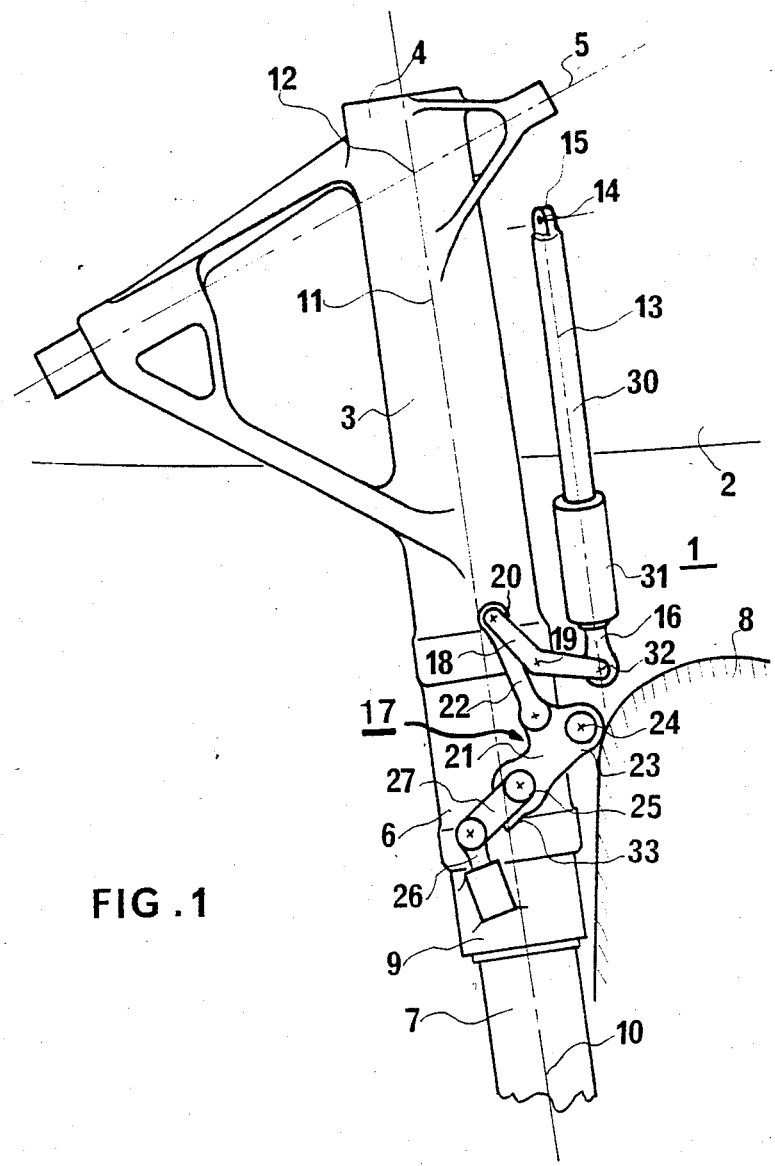
FIGS. 1 and 2 are a front view and a side view respectively of a portion of one embodiment of landing gear in accordance with the invention and in association with the structure of an aircraft.
Figure 2:
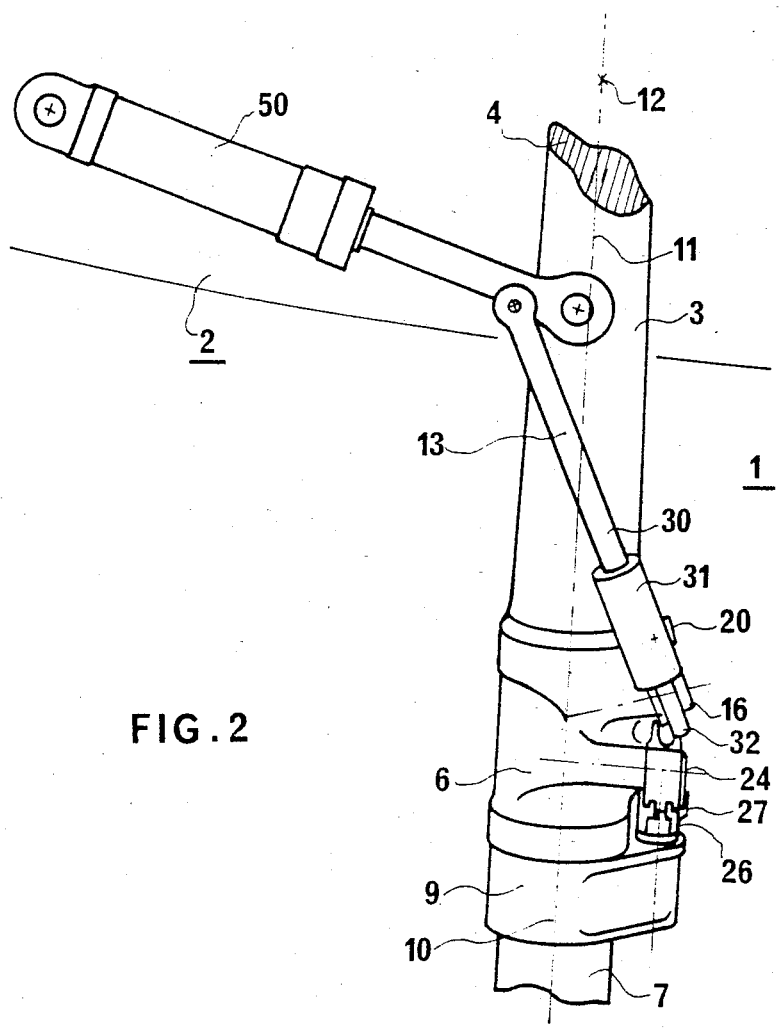

With particular reference to FIGS. 1 and 2, these figures show a portion of an embodiment of a landing gear 1 in association with an aircraft structure 2 shown very schematically.

The landing gear 1 essentially comprises a strut 3 having one end 4 which is pivoted about an axis fixed to the structure 2 of the aircraft. The other end 6 of the strut 3 includes means 7 for supporting running means 8 which are represented very schematically. However, in this embodiment, the means 7 essentially comprise a "low" portion 9 which is suitable for swivelling in the strut 3 about an axis 10.

It should be noted that in this embodiment the swivel axis 10 of the low portion 9 relative to the strut 3 is coincident with a general strut-defining axis 11. The strut body is constituted by an oblong member of substantially cylindrical shape about the said axis 11. The strut is thus suitable for pivoting about at least one point 12 through which the general strut-defining axis 11 passes. The landing gear 1 further includes a main connecting rod 13 having one end 14 pivotally mounted about a point 15 of the structure 2, eg. by means of a knuckle joint. The other end 16 of the rod 13 co-operates with the low portion 9 via a secondary crank system 17. This crank system 17 includes a bell crank 18 mounted substantially by its center to rotate about an axis 19 which is fixed to the strut 3. The end 20 of the crank 18 which is not connected to the end 16 of the rod 13 is connected to a second bell crank 21 by a first link 22.

This second crank 21 has one end 23 which is pivotally mounted about an axis 24 fixed to the strut 3, while its other end 25 is connected to a rotary spur 26 via a second link 27 having its ends rotatably mounted, eg. by means of knuckle joints, to the end 25 of the crank 21 and to the spur 26 respectively. The spur 26 is fixed to rotate with the low portion 9 in such a manner that exerting traction on the spur causes the portion 9 to swivel relative to the strut 3. Further, the rod 13 is constituted in such a manner that it can take up at least two different reference lengths. This is done in a manner which is shown diagrammatically in FIG. 3 by the connecting rod 13 comprising a rod 30 having one end which is slidably mounted, eg. by means of a piston 45, inside a cylinder 31. A spring 40 is disposed between the piston 45 and the bottom 46 of the cylinder 31 so that in an "equilibrium" or rest position the rod 13 takes up its maximum length between its ends 14 and 16 (a position which is defined by stops 47, for example). In contrast, when the rod 13 is compressed axially, thereby tending to move the piston 45 towards the bottom 46 of the cylinder 31, and hence compressing the spring 40, the rod takes up a minimum length between its ends 14 and 16.

Naturally, since the crank system 17 (which can be seen much more clearly in FIG. 1 than in FIG. 2) does not lie in a single plane in this embodiment, the connection between its various cranks and links are advantageously constituted by knuckle joints so as to facilitate rotation of the various members relative to one another.

Figure 3:
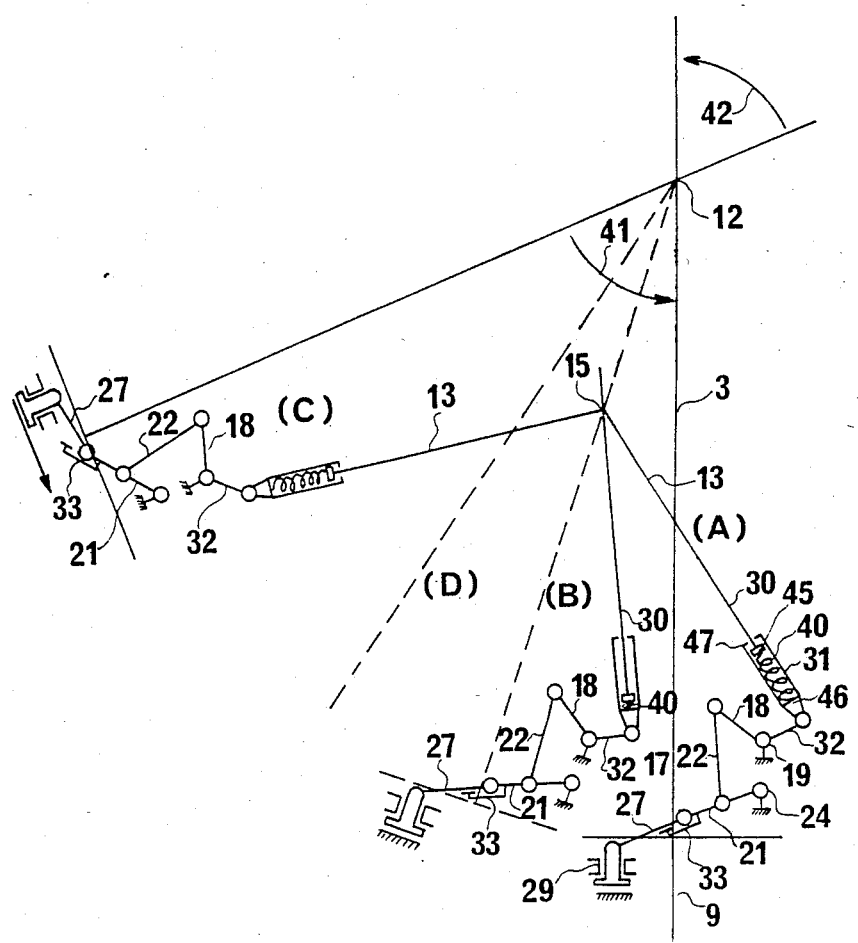
FIG. 3 is a diagram for explaining the operations which take place when the landing gear passes from one position to the other.

The anchor point 15 of the rod 13 must be situated in a well defined region of space: this characteristic will appear much more clearly in the explanation with reference to FIG. 3. However, in brief, this anchor point 15 of the rod 13 on the structure 2 lies in a dihedral angle defined between two planes which meet on a line which passes through the point 12 substantially perpendicularly to the plane of rotation of the strut 3, and each of which contains a respective one of the two lines representing the positions of the said strut-defining axis when the landing gear is in the extended position and in the retracted position. The anchor point lies in the dihedral angle through which the landing gear moves as it passes from one position to the other (retracted to extended or vice versa).

The crank system 17 is constituted in such a manner that when a traction force is exerted, eg. on the end 32 of the crank 18, towards the anchor point 15 of the rod 13, the system is capable of moving through various relative rotations, but if, in contrast, a thrust force is exerted on the end 32 (in the opposite direction to that mentioned above) from a certain position of the system 17 as shown in FIG. 1, the crank system cannot rotate and remains stationary; this is obtained by means such as a stop 33 fixed to the crank 21 and cooperating with the second link 27.

FIG. 3 shows the landing gear 1 of FIGS. 1 and 2 in a very schematic form and in various positions A, B, and C corresponding respectively to the positions: landing gear "extended"; intermediate between landing gear "extended" and landing gear "retracted"; and landing gear "retracted" inside the aircraft structure.

The various members of the landing gear are shown very schematically, but since they bear the same references as on FIGS. 1 and 2, they are easily identified. To explain the operations which take place, it will be supposed that the landing gear is initially in the "extended" position, in which position the rod 13 is at maximum length, ie. the piston 45 is as far as possible from the bottom 46 of the cylinder 31 against an end stop 47 and the spring 40 is consequently relaxed. In this case the crank system 17 is in a limit position, ie. the stop 33 on the crank 21 is pressed against the second link 27, and no clockwise rotation of the crank 21 can take place, but rotation is possible in the opposite direction.

Further, as mentioned above, the anchor point 15 of the rod 13 is situated in a dihedral angle shown schematically at 41, 42 in FIG. 3.

Thus, when the landing gear 1 is to be retracted, the strut 3 is caused to pivot about the axis 5, and thus about the point 12. The means for doing this are not described in particular, but may be constituted for example by an actuator referenced 50 in FIG. 2. Referring to FIG. 3, the strut 3 then rotates clockwise about the point 12. Since the rod 13 is fixed to the point 15 of the structure as defined above, and since its end 32 is linked to the crank system 17 which is in a fixed position, the rod 13 is also driven clockwise, but its end 32 tends to move closer to the point 15 and thus exerts thrust on the crank 18. However, the crank 18 cannot move and the rod 13 is compressed until it arrives at a limiting position shown at B when the strut-defining axis passes substantially through the point 15.

In this position B, the spring 40 is fully compressed and the piston 45 of the rod 30 is close to the bottom 46 of the cylinder 31.

As the strut continues to rotate towards the landing gear "retracted" position C, the point 32 tends, unlike the first phase A to B, to move away from the point 15, and in this case the spring 40 can relax so that the rod 13 returns to its maximum length, ie. the piston 45 moves away from the bottom 46 until it abuts against the stops 47.

The position of the strut-defining axis when the rod 13 has returned to its initial length as illustrated in position A is an intermediate position D which may be considered as being substantially symmetrical with the initial position A about the position B passing through the axis 15. Subsequently, from the position D at which the rod 13 has returned to its initial length, and so long as the strut 3 continues to rotate towards the position C, the point 32 is no longer subjected to thrust, but is subjected instead to traction causing the crank 18 to rotate anticlockwise. The alignment of the crank 21 with the second link 27 is thus "broken" by the action of the first link 22 which pushes the crank 21 anticlockwise. In this rotation of the crank about the point 24 and by means of the second link, traction is exerted substantially perpendicularly to the axis 10 on the spur 29 which therefore causes the low portion 9 to swivel about the axis 10 relative to the strut 3.

Naturally, in FIG. 3 the amplitudes of the various movements are not exactly those which would be found in practice, but defining the various lengths and the various points of rotation is not difficult for the person skilled in the art. Consequently, with a structure such as that described it can thus be observed that when the landing passes from its position A to its position C passing through intermediate positions B and D, in a first portion A to D the running means move with the strut without swivelling relative thereto. In contrast, after the strut has pivoted through a certain, readily determined angle, the wheel begins to swivel relative to the strut to take up a position which is generally at 90° to its initial position. Thus, the point at which the wheel starts swivelling can be programmed, thereby enabling the swivel of the wheel (or of some other running means) about the axis 10 at some given critical point on its travel between its extreme positions to be selected to best meet the requirements of the critical point. For example, the wheel could enter the aircraaft structure at substantially the same orientation as it occupies when the landing gear is in the "extended" position, and once through the door the wheel would swivel into its fully "retracted" position at the last moment, thus avoiding certain items as mentioned above.

Naturally, when the landing gear passes from the "retracted" position to the "extended" position, the reverse operations take place and they are therefore not described, but follow quite obviously from the operations described above.

We claim:

1. Landing gear for an aircraft structure, said landing gear being of the type which is retractable between an extended position and a retracted position, respectively, and including;

at least one strut having a general strut-defining axis, said strut having one end and another end, with one end of said strut being suitable for being pivotably mounted about at least a first point on said structure, said general strut-defining axis passing substantially through said first point, a running means supporting low portion carried by the other end of said strut and being suitable for swivelling about a first axis relative to said strut, a main rod having a first end and a second end, said first end being pivotably mountable on a second point of said structure, secondary crank means operatively coupling said strut and said low portion and the second end of said rod to swivel the low portion relative to the strut by exerting a force on said crank means via said rod, said rod including means for subjecting said rod to a variation in length between at least two reference lengths corresponding to a relaxed length and to a compressed length, said second point being contained in a dihedral angle defined between two planes which meet at a line passing substantially through said first point and containing respectively the lines representing the two positions of said general strut-defining axis when said landing gear is respectively in its extended position and in its retracted position, and said secondary crank means including a limiting abutment means for preventing any additional swivelling in one direction of said low portion from a determined position thereof relative to the strut.

2. Landing gear according to claim 1, wherein the secondary crank means includes, in association, at least one bell crank pivotally mounted about a point situated on the said strut with one of its ends rotatably linked with the second end of the said main rod and with a link rotatably coupled to the other end of the crank and said low portion.

3. Landing gear according to claim 2, wherein said at least one bell crank comprises two bell cranks, and wherein said secondary crank means is constituted by a plurality of assemblies in series, each comprising a respective bell crank associated with a link.

4. Landing gear according claim 3, wherein said limiting abutment means is constituted by a portion projecting from one of said bell cranks, engageable with a link operatively coupled to said crank.

* * * * *